No. 645,817. Patented Mar. 20, 1900.
A. C. LINDGREN.
SEEDING MACHINE.
(Application filed Jan. 12, 1900.)

(No Model.) 2 Sheets—Sheet 1.

No. 645,817. Patented Mar. 20, 1900.
A. C. LINDGREN.
SEEDING MACHINE.
(Application filed Jan. 12, 1900.)
(No Model.) 2 Sheets—Sheet 2.

Witnesses:
P. S. Elmore
A. M. E. Kennedy

Inventor:
A. C. Lindgren
By P. T. Dodge
Atty

UNITED STATES PATENT OFFICE.

ALEXUS C. LINDGREN, OF MOLINE, ILLINOIS, ASSIGNOR TO THE MOLINE PLOW COMPANY, OF ILLINOIS.

SEEDING-MACHINE.

SPECIFICATION forming part of Letters Patent No. 645,817, dated March 20, 1900.

Application filed January 12, 1900. Serial No. 1,195. (No model.)

*To all whom it may concern:*

Be it known that I, ALEXUS C. LINDGREN, of Moline, county of Rock Island, and State of Illinois, have invented a new and useful Improvement in Seeding-Machines, of which the following is a specification.

This invention has reference to that class of seeding-machines designed more particularly for planting beet-seeds and embodying a seed-dropping mechanism, a series of runners with channels into which the seed is discharged and directed into the ground, and covering or press wheels traveling in the rear of the runners and acting to cover the deposited seed with soil.

The invention consists, mainly, in adjusting devices for the runners and press-wheels so formed and arranged that the position of the runners may be changed to vary the depth of planting without materially altering the position or pressure of the press-wheels, to the end that the latter will at all times travel on the surface of the ground with a constant pressure notwithstanding the depth at which the runners may be working.

The invention also consists in the details of construction and combination of parts hereinafter described and claimed.

Figure 1:
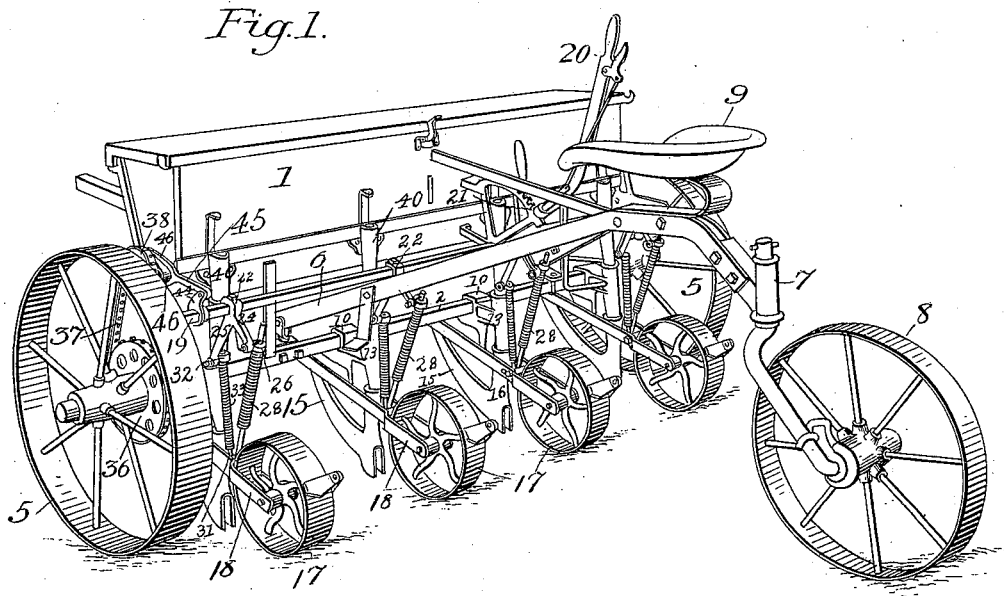
Figure 2:
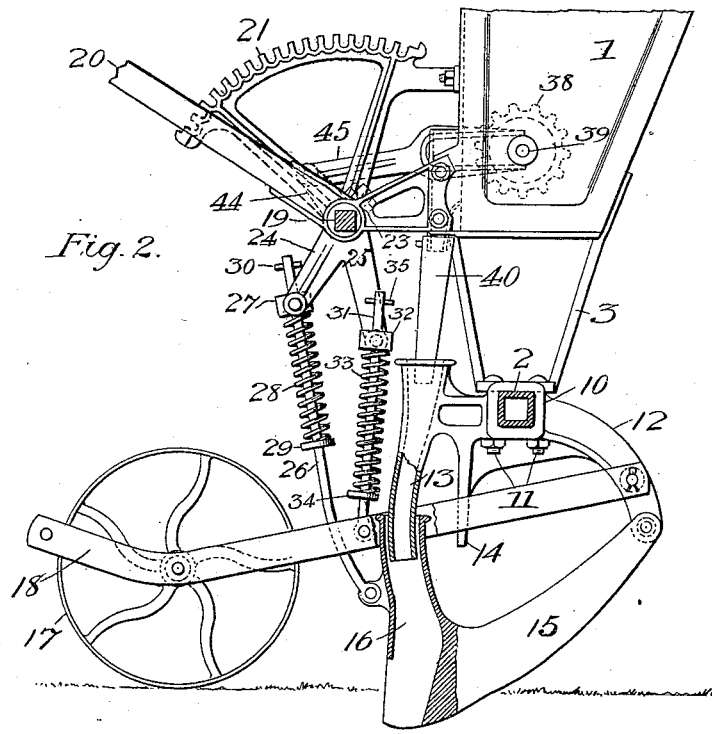
Figure 3:
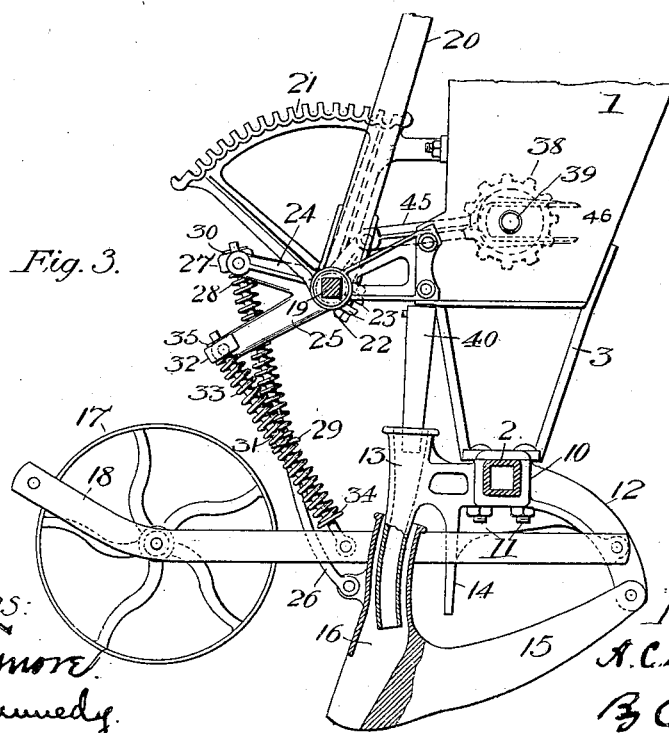

Referring to the drawings, Figure 1 is a rear perspective view of my machine with the runners and press-wheels lowered in action. Fig. 2 is a transverse sectional elevation of the same. Fig. 3 is a transverse sectional elevation showing the runners and press-wheels elevated out of action. Fig. 4 is an end elevation of the seed-hopper and adjacent parts, showing the driving devices for the seeding mechanism and the means for rendering them inoperative when the runners and press-wheels are raised. Fig. 5 is a vertical section on the line *a a* of the preceding figure; and Fig. 6 is a top plan view of the driving-sprocket, its clutch, and operating device.

In the accompanying drawings, 1 represents a seed box or hopper sustained above an axle 2, in the form of a pipe square in cross-section, by standards 3, fixed firmly to the seed-box and axle, respectively, as shown in Figs. 2 and 3. The axle is sustained by ground-wheels 5 and has connected to it frame-bars 6, extending rearward and connected with a vertical sleeve 7, in which a caster-wheel 8 is mounted, forward of which the frame-bars give support to the driver's seat 9.

At intervals on the axle are castings 10, each formed with an opening encircling the axle and adjustably secured thereto by bolts 11. Each casting is provided with a forwardly-extending arm 12, a vertical tubular extension 13 in rear of the axle, through which the seed is directed into the runners, and a vertical depending arm 14 in front of the tubular extension, the purpose of which will presently appear.

To the ends of the arms 12 are pivoted the forward ends of runners 15, having in their rear ends vertical tubular channels 16, with their upper ends encircling the lower ends of the tubular extensions 13, as shown in Fig. 2, the size and arrangement of the parts being such that the tubular extensions and runners will telescope when the latter are elevated, as shown in Fig. 3.

In rear of each runner is a press or covering wheel 17, journaled in a press-wheel frame 18, comprising two bars extending forwardly on opposite sides of the runner and the depending arm 14 and pivoted at their forward ends to the arm 12. The construction is such that the press-wheels, like the runners, may be raised vertically, they being guided in their movements by the depending arms 14, extending between the bars of the frames.

In the operation of machines of this nature in planting it is desirable that the press-wheels travel at all times at the surface of the ground and act with a uniform pressure notwithstanding the position of the runners, whether adjusted to plant deeply or near the surface.
To effect this result and to provide means for readily adjusting the parts and for elevating them out of action, I mount in brackets on the back of the hopper a square rock-shaft 19, operated by a hand-lever 20, provided with a locking-dog engaging a toothed plate 21. At intervals on this rock-shaft corresponding in position with the runners and press-wheels are applied a series of sleeves 22, held adjustably by bolts 23 and each provided with two radiating arms 24 and 25, the former being shorter than arm 25 and extending in the rear thereof. Arm 24 is connected with the runner by a rod 26, pivoted at its lower end at the back of the runner and extending at its upper end through a hole in a head 27, pivoted on the end of the arm. The rod is encircled by a spiral spring 28, bearing at its upper end against the under side of the head and at its lower end against a washer 29, fixed to the rod. By this construction when the arm 24 is lowered it acts through the spring to depress the runner, and when the arm is elevated it engages a cross-pin 30 on the upper end of the rod and positively lifts the runner from the ground. Radial arm 25 is connected with the presser-wheel frame in precisely the same manner through the medium of rod 31, pivoted at its lower end between the bars of the frame and extending at its upper end through an opening in a head 32, pivoted to the end of the arm. This rod 31 is encircled by a spiral spring 33, acting in the same manner as spring 28 against the head 32 and a washer 34 on the rod, which latter is provided with a cross-pin 35 at its upper end adapted to be engaged by the head on the arm when the latter is elevated to raise the presser-wheel.

The point at which rod 31 is connected with the presser-wheel frame and the relative arrangement of the hand-lever 20 and radial arms 24 and 25 are such that when the lever is pulled to the rear to depress the radial arms and lower the runners and press-wheels into action, as shown in Fig. 2, the arm 25 and rod 31 will be in line, or practically so, with the press-wheels at the lowest point, so that the arm 25 may be moved a considerable extent to right or left without changing materially the pressure of the press-wheels either to raise or lower the same. The other radial arm 24, however, extends rearward at an angle and would, with this to-and-fro movement of arm 25, move from a higher to a lower point, and vice versa, and would depress or elevate the runners to vary the depth of the planting. From this description it is seen that by the peculiar form and arrangement of the radial arms and their connected parts the position of the runners may be varied to plant deeper or near the surface without materially affecting the position or pressure of the covering-wheel, which will travel at all times at the surface and act at a uniform pressure. It will further be seen that the runners and presser-wheels may yield independently and may by the operation of the hand-lever be raised positively out of action or lowered into action, as desired.

In the operation of the machine motion is imparted from ground-wheel 5 to a sprocket-wheel 36, which, through the medium of a sprocket-chain 37, drives a small sprocket-wheel 38, clutched to the outer end of horizontal shaft 39, extending within the hopper and operatively connected with the seeding mechanism. (Not shown.) The seed is discharged as the machine advances through the back of the hopper and into vertical seed-tubes 40, having their lower ends extending into the upper ends of the tubular extensions 13, whence the seed passes through the runners and is deposited in the ground. In order that when the hand-lever is pushed forward to elevate the runners and press-wheels out of action the seeding mechanism may be automatically rendered inoperative, I so form the clutch on the end of the drive-shaft 39 that it will be automatically disengaged. This is effected by mounting the sprocket-wheel 38 loosely on the shaft to slide to a limited extent to disengage its teeth from those on a clutch-sleeve 41, fixed to the shaft. The sprocket-wheel is urged into engagement with the clutch-sleeve by spring 42, encircling the shaft between the wheel and a collar 43, fixed to the end of a shaft. Applied to the end of rock-shaft 19 is an arm 44, having pivoted to its end a rod 45, provided with two tapering fingers 46, adapted to extend above and below the shaft between the sprocket-wheel and a flange on the clutch-sleeve, as clearly shown in Figs. 4 and 5. When the seeding mechanism is in action, with the runners and press-wheels lowered, the arm 44 extends rearward, with the fingers withdrawn and the spring holding the sprocket-wheel in engagement with the clutch-sleeve. When, however, the shaft 19 is rocked to raise the runners and press-wheels out of action, as shown in Fig. 3, the fingers 46 will be forced forward between the sprocket-wheel and clutch-sleeve and will positively push the wheel outward against the action of the spring and disengage the clutch, thereby stopping the operation of the seed-discharging mechanism.

It is obvious that the mechanism as regards the details may be variously modified without departing from the limits of my invention. For instance, it is not essential that the radial arms be both formed integral with the encircling sleeve, but these arms may be applied to the shaft in other ways and by separate sleeves, provided their relation and the general arrangement of the parts are such that the operation will be substantially as above described.

Having thus described my invention, what I claim is—

1. In a seeding-machine, the combination with a vertically-movable runner and a vertically-movable press-wheel, of means for raising and lowering said parts, and means for adjusting the runner to vary the depth of planting, without materially altering the position of the press-wheel.

2. In a seeding-machine, the combination with a vertically-movable runner and a vertically-movable press-wheel, of an adjusting device common to said parts and connected therewith, said adjusting device formed and arranged to move the runner and wheel vertically and adapted to adjust the runner without changing the position of the wheel.

3. In a seeding-machine, the combination with a vertically-movable runner and a vertically-movable press-wheel, of springs acting thereon, means for raising and lowering the parts, and means for varying the pressure of the spring on the runner without varying the pressure of that on the press-wheel.

4. In a seeding-machine, the combination with a vertically-movable runner and a vertically-movable press-wheel, of a rocking arm, a rod connecting said arm with the press-wheel and adapted, when the press-wheel is lowered, to extend in line with the arm, a second rocking arm fixed with relation to the first arm, and a rod connecting the same with the runner and adapted, when the press-wheel is lowered, to extend at an inclination to the second arm.

5. In a seeding-machine, the combination with a vertically-movable runner and a vertically-movable press-wheel, of a rocking arm, a rod having a sliding connection with the arm and jointed to the press-wheel, a spring encircling the rod and acted on by the arm, a second arm, a rod having a sliding connection therewith and jointed to the runner, and a spring encircling said rod and acted on by the second arm.

6. In a seeding-machine, the combination with a vertically-movable runner and a vertically-movable press-wheel, of rocking arms extending one in the rear of the other, means for rocking the arms, a connection between the front arm and the press-wheel, and a connection between the rear arm and the runner.

7. In a seeding-machine, the combination with a series of vertically-movable runners and vertically-movable press-wheels, of a rock-shaft thereover, a series of pairs of arms on said shaft, each pair comprising a front and a rear arm, a series of rods connecting the front arms respectively with the press-wheels, and a series of rods connecting the rear arms respectively with the runners.

8. In a seeding-machine, the combination with a vertically-movable runner and a vertically-movable press-wheel, of a movable frame in which the press-wheel is mounted, a rock-shaft above said parts, an arm fixed to the shaft and formed with a pivoted head, a rod extending through the head and jointed to the press-wheel frame, a spring encircling the rod and bearing on the head, a second arm fixed to the shaft and formed with a pivoted head, a rod extending through the head and jointed to the runner, and a spring encircling said rod and bearing on the pivoted head.

9. In a seeding-machine, the combination with the axle and its sustaining-wheels, of a depending guide-arm, a vertically-movable press-wheel frame comprising two arms extending at opposite sides of the guide-arm, a press-wheel journaled in the frame and means for raising and lowering the frame.

10. In a seeding-machine, the combination with the axle and ground-wheels, of a casting applied to the axle and formed with a depending guide-arm, a forwardly-extending arm, and a rear tubular extension, a runner pivoted to the forwardly-extending arm and formed with a seed-channel adapted to receive the tubular extension, a press-wheel frame comprising two bars extending at the sides of the runner and guide-arm and pivoted to the forwardly-extending arm, a press-wheel mounted in said frame and means for raising and lowering the press-frame and the runner.

In testimony whereof I hereunto set my hand, this 11th day of December, 1899, in the presence of two attesting witnesses.

ALEXUS C. LINDGREN.

Witnesses:
A. J. BRESSLAU,
THEO. STARKS.